(12) United States Patent
Marshall et al.

(10) Patent No.: US 8,237,779 B2
(45) Date of Patent: Aug. 7, 2012

(54) CODING SCHEME FOR DIGITAL VIDEO SIGNALS AND AN IMAGE ARCHITECTURE USING THE SAME

(75) Inventors: Stephen W. Marshall, Richardson, TX (US); Michael David McCormick, Allen, TX (US); Henry William Neal, Allen, TX (US); Stanford Porter Hudson, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1131 days.

(21) Appl. No.: 12/062,761

(22) Filed: Apr. 4, 2008

(65) Prior Publication Data

US 2009/0251531 A1    Oct. 8, 2009

(51) Int. Cl.
*H04N 13/04* (2006.01)

(52) U.S. Cl. .................. 348/51; 348/42; 348/46

(58) Field of Classification Search .................... 348/42, 348/46, 51

See application file for complete search history.

(56) References Cited

U.S. PATENT DOCUMENTS

| | | | |
|---|---|---|---|
| 5,815,314 A * | 9/1998 | Sudo | 359/472 |
| 6,288,741 B1 * | 9/2001 | Alejo Trevijano | 348/42 |
| 6,445,366 B1 * | 9/2002 | Hattori | 345/55 |
| 6,831,678 B1 * | 12/2004 | Travis | 348/46 |
| 7,843,449 B2 * | 11/2010 | Krah | 345/419 |
| 2004/0141089 A1 * | 7/2004 | Wada | 348/375 |
| 2006/0002634 A1 * | 1/2006 | Riley et al. | 382/294 |
| 2006/0093386 A1 * | 5/2006 | Oki | 399/49 |
| 2011/0254926 A1 * | 10/2011 | Ushiki et al. | 348/46 |

* cited by examiner

*Primary Examiner* — Liangche A Wang

(74) *Attorney, Agent, or Firm* — Warren L. Franz; Wade J. Brady, III; Frederick J. Telecky, Jr.

(57) ABSTRACT

Video signals in a video stream are encoded by inserting reference signals in the video stream such that the encoded video stream carry both reference signals and video signals being coded. In the decoding stage, reference images generated from the reference signals are detected and used for identifying the encoded video signals based upon the profiles of the detected reference images. An imaging architecture capable of using the coding scheme comprises a shutter that can be implemented as a dual-processor configuration.

24 Claims, 12 Drawing Sheets

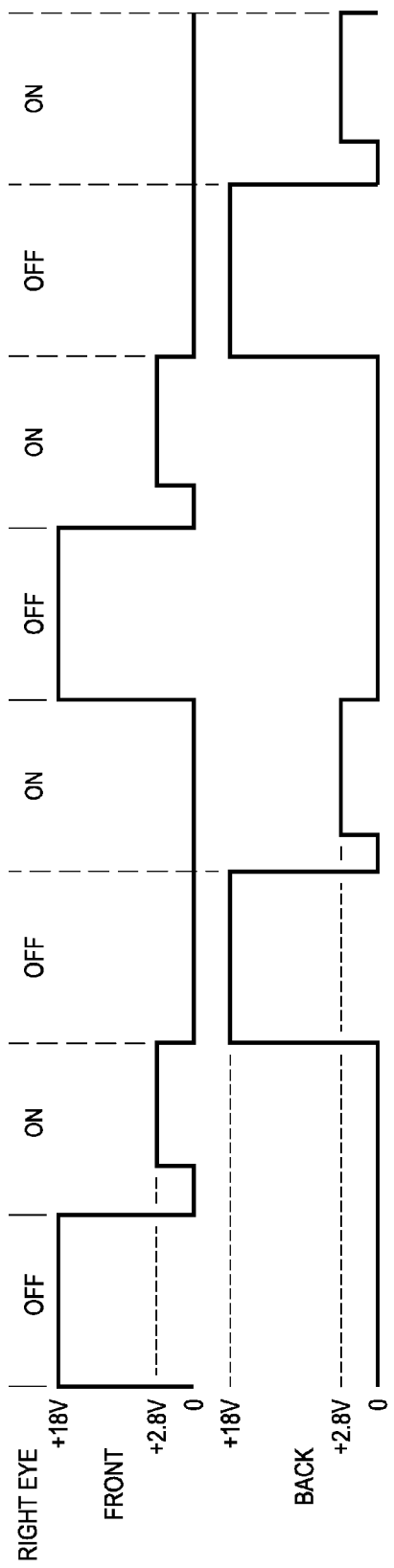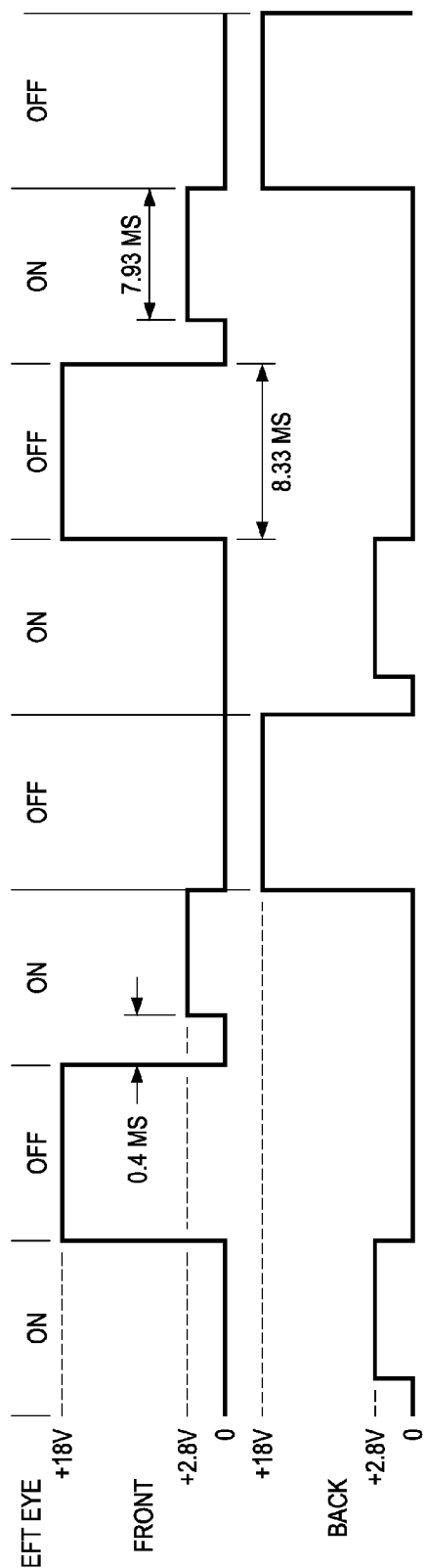

CODING SCHEME FOR DIGITAL VIDEO SIGNALS AND AN IMAGE ARCHITECTURE USING THE SAME

TECHNICAL FIELD OF THE DISCLOSURE

The technical field of this disclosure relates to imaging methods and systems; and more particularly to video signal processing and image presentation.

BACKGROUND OF THE DISCLOSURE

In many current applications involving digital video signals, digital video signals are often desired to be coded with selected coding schemes during signal processing, storing, delivering, and/or reproducing. Even though compression may or may not be desired after coding, it is often desired that video signals can be identified individually or in groups after coding.

For example, stereoscopic video signals generally represent views of a particular scene from two perspectives such as from the right eye and left eye of a viewer. By rendering separate images of the video signals for the right and left eyes respectively, the illusion of three dimensional depth can be presented. Specifically, the left and right images are alternated rapidly on a screen. When the viewer looks at the screen through active shutter glasses, each shutter is synchronized to occlude the unwanted images and transmit the wanted images. Thus each eye sees only its appropriate perspective view. The left eye behind the left shutter sees only the left view; and the right eye behind the right shutter sees only the right view. In order to synchronize the shutter glasses to the images for different perspectives, it is desired to code the video signals. The coded images for different perspectives can be identified and differentiated by the shutter glasses.

In multi-view applications, images for different viewers can be sequentially displayed on a screen. Shutters of different viewers selectively pass wanted images and block unwanted images. Accordingly, images for such applications are desired to be coded such that shutters of different viewers can identify and differentiate the displayed images.

In some other applications, different streams of video signals/images (e.g. for different viewing purposes) are mixed and processed, stored, and/or delivered as a combined video stream. In these applications, video signals of different streams are desired to be coded such that they can be identified and differentiated during processing, storing, and/or delivering.

SUMMARY

In one example a method for coding a stream of video signals is disclosed. The method comprises: inserting a sequence of reference signals to the stream of video signals, wherein each reference signal inserted in the stream has a profile; and the video signals in the stream are identified by the profile of at least one of the reference signals.

In another example, a method is disclosed herein, comprising: receiving a stream of encoded video signals comprising a sequence of reference image signals and embedded video signals; searching for a reference image, comprising: extracting a profile of each signal in the stream; determining a reference image based upon an extracted profile of a signal and a predetermined criterion; and decoding the found reference image.

In yet another example, a decoding device is provided, comprising: a receiver for detecting a stream of video signals comprising a reference image signal and a video image signal; a first processor for decoding the video image signal based upon a detection of the reference image signal and a predetermined criterion; and a second processor for managing power for the components in the device, comprising: a shutter control unit for providing control signals for a shutter that is connected to the second processor.

In yet another example, an imaging architecture with both stereoscopic and multi-view capabilities is provided, comprising: an encoder, comprising: a light valve comprising an array of individually addressable pixels; and a control unit and a storage; a screen on which images are displayed; and a decoder, comprising: a receiver for receiving a stream of video signals comprising a sequence of video signals and embedded reference signals; a first processor for decoding the embedded reference signals based upon the detection of the reference signals and a set of criteria; and a second processor for managing power for the components in the device, comprising: a controller for switching the shutters and the second processor to switch between the stereoscopic mode and the multi-view mode.

In yet another example, a method is disclosed, comprising: encoding a stream of video sub-frames with a sequence of reference signals that correspond to a reference image, wherein the positions of the reference signals in the stream identify the individual sub-frames; displaying the video frames and reference images on a screen; and decoding the images displayed on the screen based upon the reference images and a set of predetermined criteria.

BRIEF DESCRIPTION OF DRAWINGS

FIG. 5a schematically illustrates a criterion that can be used for detecting the coded video signals in FIG. 2a;

FIG. 5b schematically illustrates an additional criterion that can be used for detecting the coded video signals in FIG. 2a;

FIG. 9b and FIG. 9c are block diagrams showing the functional modules and operations of the processors embedded in the synchronization unit of FIG. 9a;

FIG. 10b and FIG. 10c diagrammatically illustrate exemplary waveforms that can be used for driving the shutters in the shutters in FIG. 10a.

DETAILED DESCRIPTION OF SELECTED EXAMPLES

Disclosed herein is a coding scheme for coding video signals by inserting reference signals in a video stream such that video signals for different purposes in the video stream can be identified and differentiated. In stereoscopic and/or multi-view imaging applications, reference image signals and video signals are delivered to a light valve that generates reference images according to the reference image signals and video images according to the video signals. The displayed reference images can be detected by a detector; and the information carried by the detected reference images can be used for identifying displayed video images. The identified video images can be delivered to the right and left eyes or to different viewers by using active shutter glasses.

In the following the coding method and the imaging architecture will be discussed with reference to selected examples. It will be appreciated by those skilled in the art that the following discussion is for demonstration purposes, and should not be interpreted as a limitation. Other variations within the scope of this disclosure are also applicable. In particular, it will be appreciated by those skilled in the art that the coding scheme and the imaging architecture are independent techniques; and can be used separately.

Figure 1:
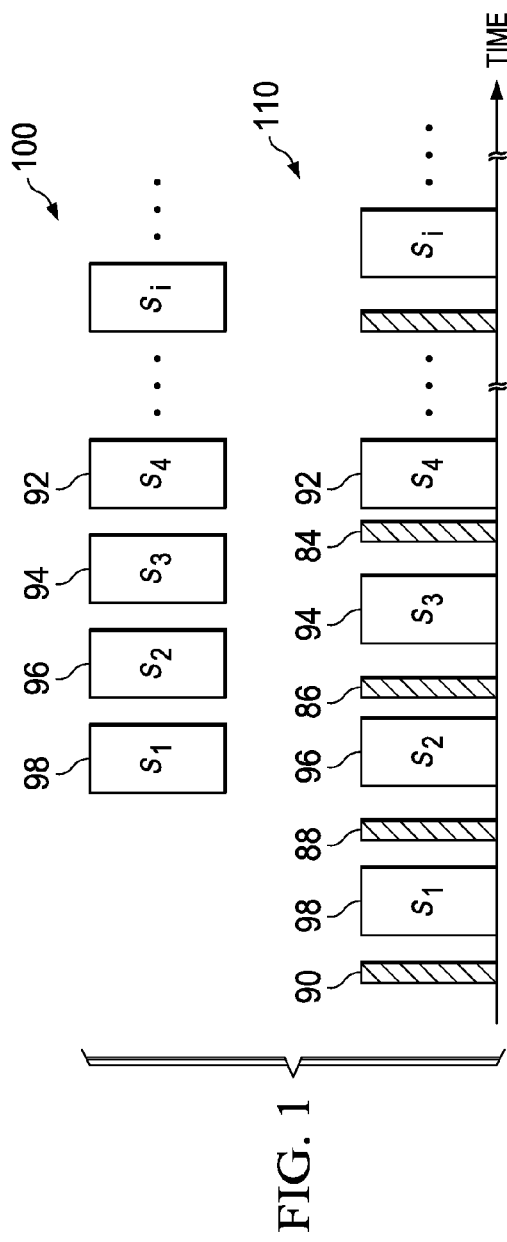
FIG. 1 schematically illustrates an exemplary coding scheme capable of coding digital video signals.

Referring to the drawings, FIG. 1 schematically illustrates a coding scheme for coding a stream of video signals. For demonstration purpose, video stream 100 comprises a sequence of video blocks such as video blocks $S_1$ (98), $S_2$ (96), $S_3$ (94), $S_4$ (92), and $S_i$. Each video block comprises one or more video signals; and the video signals in different video blocks are provided for different purposes. For example, each video block can comprise video signals corresponding to a video frame or a video sub-frame. In stereoscopic imaging, a video block may comprise video signals corresponding to a video sub-frame for the right or the left eye of a viewer; and the video stream comprises video signals for the right and the left eyes of the viewer. In multi-view imaging, a video block may comprise video signals corresponding to a video frame to be viewed by one of the multiple viewers; and the video stream comprises video signals for video frames to be viewed by the multiple viewers. In some other examples, a video block may comprise restricted video signals that are assigned to a confidential level; and the video stream comprises video blocks with different confidential levels.

In order to identify the video blocks in a video stream such that video blocks for different purposes can be identified and differentiated, reference signals can be inserted in the video stream to be coded, as schematically illustrated in the lower diagram of FIG. 1. Specifically, the reference signals can be inserted to the video stream such that the coded video stream (110) comprises both of the reference signals and the video signals.

In the example as illustrated in the lower diagram, reference blocks 90, 88, 86, and 84 each having one or more reference signals are inserted in the video stream such that the reference blocks (90, 88, 86, and 84) and the video blocks (98, 96, 94, and 92) are alternated in the encoded video stream (110). In other examples, the reference blocks can be placed in the video stream in any other suitable ways. The reference signals can be of the same nature as the video signals. Specifically, if the video blocks each comprise video signals corresponding to a video frame (or sub-frame) the reference blocks each comprise reference signals that correspond to a predetermined image. In other examples, a reference block may comprise reference signals of different nature from the video signals in the video blocks.

Each video block is referenced by a reference block. Specifically, each video block can be uniquely referenced by the profile of a reference block. The profile of a reference block characterizes the reference block in the encoded video stream. For example, the profile of a reference block can include, but not be limited to, the relative position of the reference block, the nature of the reference signals in the reference block, properties of the reference signals in the reference block, and the width (time duration) of the reference block.

Using the relative position of a reference block in an encoded video stream for identifying video blocks can be accomplished by placing substantially the same reference blocks at different positions between the video blocks, an example of which will be discussed afterwards with reference to FIG. 2a.

Using the reference signals of different natures for identifying video blocks in an encoded video stream can be accomplished by placing reference signals of different specific combinations in the video stream. For example, a first reference block may comprise image signals corresponding to a first predetermined image, such as a full-white image, a full-black image, a checkerboard image, or any other predetermined images or patterns. A second reference block may comprise image signals corresponding to a second predetermined image, such as a full-white image, a full-black image, a check-board image, or any other predetermined images, wherein the first and the second images are different and the difference can be detected by the specific detector to be used for identifying the video signals. The first and second reference blocks in the stream can be used to identify video blocks for the first and second purposes. In another example, reference blocks comprising a single digit "0" or "1" can be used for identifying two different groups of video blocks. In yet another example, reference blocks comprising different combinations of digits, such as "00000" and "111111" can be used for identifying different groups of video blocks.

Reference signals of different properties can be used for identifying video signals for different purposes. For example, reference blocks comprising reference signals of different frequencies (periods or amplitudes) can be inserted in the video stream for identifying the video blocks. For another example, reference blocks comprising video signals corresponding to images of different monochromatic or chromatic values (e.g. red, green blue, white, yellow, cyan, magenta, or any combinations thereof) can be used for identifying the video blocks.

Reference blocks of different widths (time duration) can be used for identifying video signals for different purposes. For example, reference blocks with different widths can be placed in the video stream for identifying the video blocks.

Figure 2A:
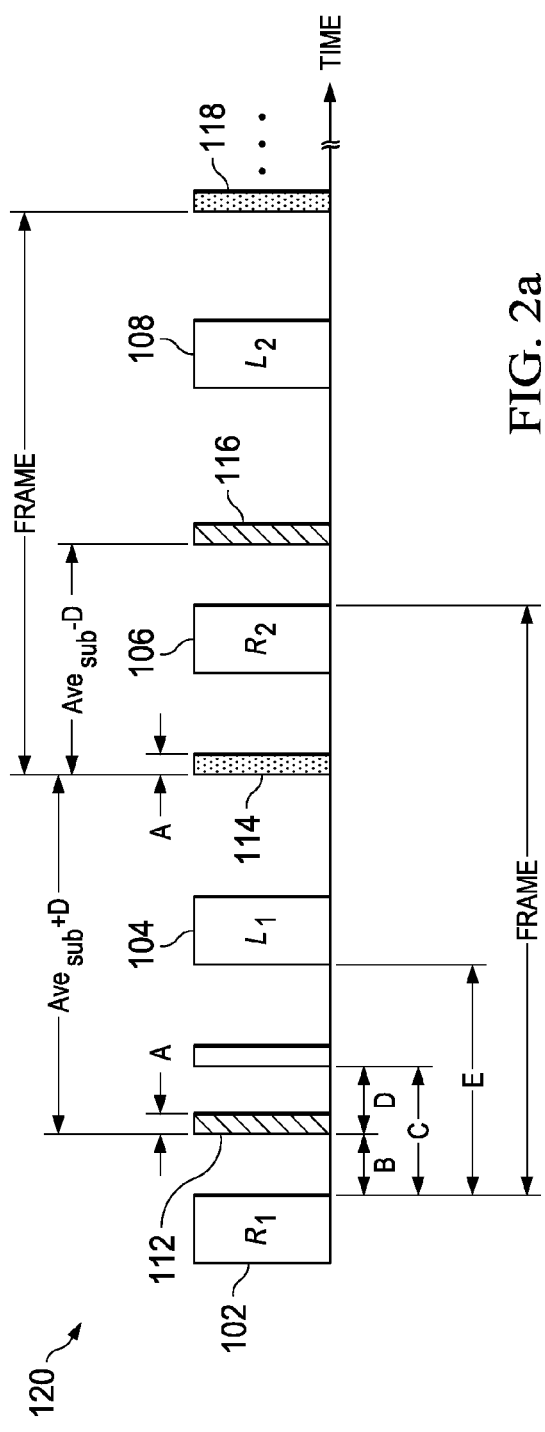
FIG. 2a schematically illustrates an exemplary implementation of the coding scheme illustrated in FIG. 1.

For demonstration purpose, FIG. 2a schematically illustrates an exemplary method of identifying the video blocks according to the relative positions of the video blocks in a video stream, wherein the video blocks comprise video signals for the right and left eyes of a viewer in a stereoscopic imaging application and the reference blocks comprise image signals of a predetermined reference image (e.g. full-white or full-black). It is noted that each reference block in this example comprises substantially the same amount of data as each video block. In other words, the displayed reference image has substantially the same native resolution as a video image for the right or the left eye of the viewer.

Referring to FIG. 2a, video blocks marked as "$R_1$" and "$R_2$" comprise video signals for the right eye of the viewer; and video blocks marked as "$L_1$" and "$L_2$" comprise video signals for the right eye of the viewer. The video blocks for the right and left eyes are alternately disposed positioned in the encoded video stream 120 that further comprises reference blocks 112, 114, 116, and 118.

A reference block and only one reference block is positioned between two adjacent video blocks. In other examples, the video blocks and the reference blocks can be arranged in many other ways as long as the video blocks for the right and the left eyes can be identified and differentiated during the detection stage. For example, the reference blocks designated for identifying the right eyes (or the left eyes) can be positioned after the video blocks for the right eye; while the reference blocks designated for identifying the left eyes (or the right eyes) can be positioned before the video blocks for the left eye. In another example, especially when the video blocks are periodically positioned in the stream such that the positions of the remaining video blocks can be predicted based upon the positions of a pair of video blocks for the right and the left eye (or a single video block for the right or the left eye), a pair of reference blocks (or a single reference block) can be used for identifying the pair of video blocks (or the single video block). In yet another example, a specific reference block can be provided for identifying the start and/or the end of the entire video stream, which is not required.

As schematically illustrated in FIG. 2a, the period between two consecutive video blocks for the same eye (e.g. the right or the left eye), such as the period between video blocks $R_1$ 102 and $R_2$ 106 (or between video blocks $R_1$ 102 and $R_2$ 106) is equal to the frame period of the video stream. The successive video blocks for different eyes (e.g. for the right and the left eyes) are separated by "dark-times" during which substantially no other video blocks/video signals, except for reference blocks/reference signals, are present. The dark-time can be accomplished by passing the video signals in the video blocks through a data formatter (e.g. in an imaging system used for displaying the video signals in the video blocks); and operating the data formatter at a rate higher than the rate of the video signals in the video blocks (e.g. the frame rate of the video signals). In the example as illustrated in FIG. 2a, the dark-times between video blocks are substantially the same. In other words, the video blocks are substantially equally spaced in time.

Because the video stream comprises two groups of video blocks—one group for the right eye and the other group for the left eye. Accordingly, two groups of reference blocks are in the video stream. Specifically, reference blocks, such as 112 and 116 are disposed for identifying video blocks for the right eye (e.g. video blocks $R_1$ and $R_2$); while reference blocks, such as 114 and 118 are disposed for identifying video blocks (e.g. sub-frames $L_1$ and $L_2$) for the left eye. The identification is based upon the profile of the reference blocks, specifically, based upon the relative positions of the reference blocks in the video stream.

In the example as schematically illustrated in FIG. 2a, the reference blocks are interleaved. The positions of consecutive reference signals change on alternative video blocks. For example, reference block 112 for identifying video block $R_1$ is behind the trailing edge of video block $R_1$ for a time period of B; while reference block 114 for identifying video block $L_1$ is behind the trailing edge of video block $L_1$ for a time period of (B+D), wherein D is larger than zero (as demonstrated by the dashed block in FIG. 2a).

Within a dark-time, such as the dark-time between sub-frames $R_1$ and $L_1$, the front-porch B (or C=B+D) of a reference block (e.g. reference block 112 or 114) is the time interval between the trailing edge of a video block (e.g. video block $R_1$ or video block $L_1$) and the leading edge of a reference block (e.g. reference signal 112 or 114) that identifies the video block.

A is the width (time duration) of a reference block. In the example as illustrated in FIG. 2a, the reference blocks have substantially the same width. In other examples as discussed above, the reference blocks may have different properties, such as widths or amplitudes or a combination thereof. E is the edge-to-edge interval between two adjacent video blocks (e.g. video blocks $R_1$ and $L_1$); and is equal to the length of a dark-time. The interval between two consecutive reference blocks (e.g. reference blocks 112 and 114) is equal to $Ave_{sub}+D$ or $Ave_{sub}-D$, wherein $Ave_{sub}$ is the average period between two consecutive video blocks, such as the period between video blocks $R_1$ and $L_1$ or the period between video blocks $L_1$ and $R_2$. The difference (E−B) of E and B is referred to as the "back-porch" of a reference block, such as reference block 112.

The reference blocks in the coded video stream may be configured to have different profiles, some examples of which are shown in TABLE 1. It will be appreciated by those skilled in the art that the parameters of the reference blocks and the video blocks in a coded video stream as presented in TABLE 1 are for demonstration purposes only. Other variations are also applicable. For example, the coding scheme is applicable to video streams with any desired frame rates, sub-frame rates, and/or dark-time periods. The reference blocks can be configured to different parameters, such as the front-porch (e.g. the value of D or C), the delta period (D), and/or the back-porch (e.g. the value of E−B or the value of E−C). In particular, a video stream with a given frame rate can be coded using reference blocks of different configurations.

TABLE 1

| Frame rate (Hz) | Sub-frame period (ms) | A (us) | B (us) | C (us) | D (us) | E (ms) |
| --- | --- | --- | --- | --- | --- | --- |
| 62 | 8.0645 | 25 | 500 | 628 | 128 | 2.000 |
| 60 | 8.3333 | 26 | 517 | 649 | 132 | 2.067 |
| 50 | 10.000 | 31 | 620 | 779 | 159 | 2.480 |

Figure 2B:
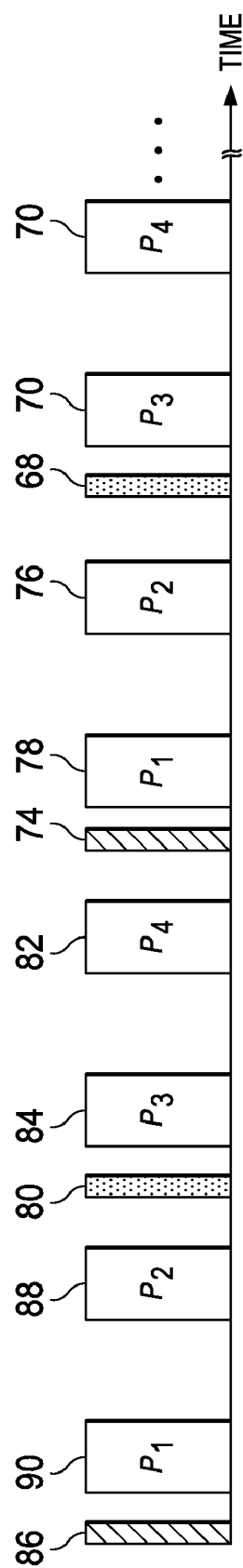
FIG. 2b schematically illustrates another exemplary implementation of the coding scheme illustrated in FIG. 1 especially for use in multi-view imaging application.

The reference blocks can be inserted in the video stream in many other ways, an example of which is schematically illustrated in FIG. 2b. Referring to FIG. 2b, the video stream comprises video blocks for multiple viewers, which comprise viewers $P_1$, $P_2$, $P_3$, and $P_4$ in this example. In other examples, the video stream may comprise video blocks (video signals) for any suitable numbers of viewers/players in a multi-view imaging/entertaining application. Specifically, video blocks 90 and 78 each comprise video signals for viewer $P_1$. Video blocks 88 and 76 each comprise video signals for viewer $P_2$. Video blocks 84 and 72 each comprise video signals for viewer $P_3$. Video blocks 82 and 70 each comprise video signals for viewer $P_4$.

Reference blocks 86, 80, 74, and 68 are inserted for identifying the video blocks 90, 88, 84, 82, 78, 76, 72, and 70. In this example, two video blocks are deployed between two consecutive reference blocks. For example, video blocks 90 and 88 for viewers $P_1$ and $P_2$ are placed between consecutive reference blocks 86 and 80. A single reference block is placed between two adjacent video blocks, such as reference block 80 between video blocks 88 and 84. Some of the adjacent video blocks, such as video blocks 90 and 88, do not have a reference block placed therebetween. In other words, reference blocks are disposed in every other dark-time periods between video blocks. The reference blocks can be disposed at different relative positions between the video blocks (or in the dark-time periods), especially when the reference blocks have substantially the same profile. The time intervals (the length of the dark-time period) between adjacent video blocks may or may not be the same. The reference blocks may have different profiles, such as different widths, frequencies, amplitudes, or combinations of reference signals composed therein. With the reference blocks, video blocks in the stream for multiple viewers can be identified.

Figure 2C:
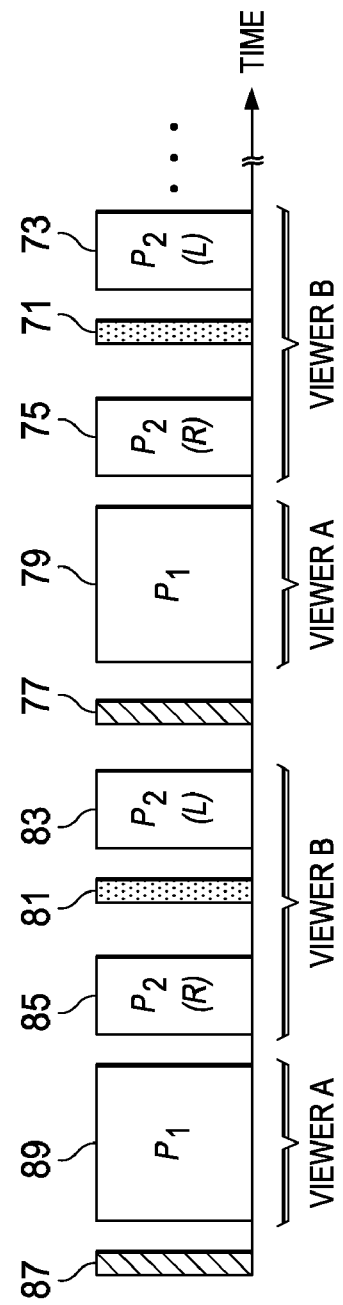
FIG. 2c schematically illustrates yet another exemplary implementation of the coding scheme illustrated in FIG. 1 especially for use in stereoscopic and multi-view imaging application.

Another coding scheme for encoding video blocks using reference blocks is schematically illustrated in FIG. 2c. Referring to FIG. 2c, video blocks 89, 85, 83, 79, 75, and 73 each comprise video signals for viewers A and B, wherein viewer A experiences traditional (non-stereoscopic) image viewing; while viewer B experiences stereoscopic image viewing. Accordingly, video blocks 89 and 79 each can be full video frames; while video blocks 85, 83, 75 and 73 each can be video sub-frames for the right and left eyes of viewer B. Specifically, video blocks 85 and 75 can be video sub-frames for the right eye; and video blocks 83 and 73 can be video sub-frames for the left eye of viewer B. Reference blocks 87, 81, 77, and 71 can be inserted in the video stream in the same way as that discussed above with reference to FIG. 2b. For example, reference blocks can be inserted in every other dark-time periods between consecutive video blocks; and the relative positions of two consecutive reference blocks in the dark-time periods can be different so as to identify the video blocks, which will not be repeated herein.

The reference blocks can be inserted into a video stream to be coded in many ways, a process of which is referred to as a coding process. In one example, the reference blocks can be inserted to the video stream by displaying the reference signals in the reference blocks along with the video signals in the video blocks to be coded based upon the desired coding scheme, as schematically illustrated in FIG. 3.

Figure 3:
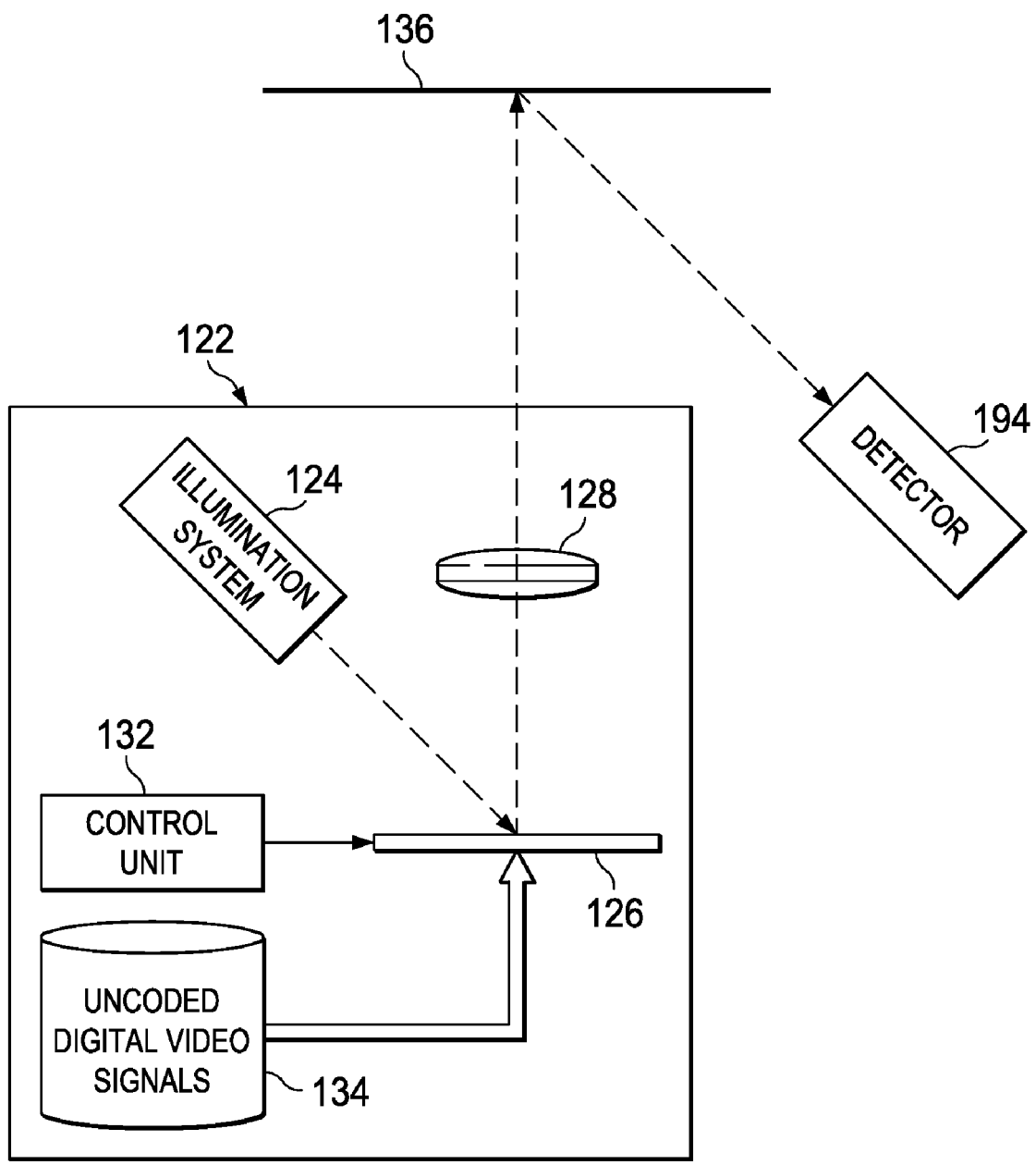
FIG. 3 schematically illustrates an exemplary method of coding digital video signals in an imaging system.

Referring to FIG. 3, the display system comprises coding system 122, screen 136, and detector 194 disposed in an eyewear of a viewer (not illustrated for simplicity). The coding system (122) comprises illumination system 124, light valve 126, control unit 132, storage 134, and optical element 128.

The light valve (126) comprises an array of individually addressable pixels that are preferably microelectromechanical devices. For example, the light valve may comprise an array of individually addressable micromirrors, such as a DLP™ digital micromirror device (DMD) from Texas Instruments Incorporated The light valve can be other devices, such as a liquid-crystal panel, a liquid-crystal-on-silicon panel, an organic-light-emission-diode panel, a plasma panel, or any other suitable display device. In examples wherein the light valve comprises self-light emitting pixels, such as plasma cells, the illumination system may not be necessary.

The light valve (126) may have any desired native resolution, wherein the native resolution is referred to as the total number of individually addressable pixels in light valve. For example, the light valve may have a native resolution of 640×480 or more, 800×600, 1280×720 or more, 1024×768 or more, 1280×800 or more, 1280×1024 or more, 1400×900 or more, 1600×1200 or more, 1680×1050 or more, or 1920× 1080 or more. Of course, the light valve may have other desired native resolutions.

In the example as illustrated in FIG. 3, the light valve (126) is a reflective, transmissive, or semi-transmissive light valve, such as a micromirror-based light valve, a LCoS, or a LCD panel, which needs illumination light. The illumination light is provided by illumination system 124 which comprises one or more illuminators, such as arc lamps and solid-state illuminators (e.g. lasers or light-emission-diodes). The illumination light from illumination system 124 is directed to light valve 126 so as to illuminate the pixels of the light valve.

Under the control of control unit 132, video signals in video blocks are retrieved from storage 134 and delivered to light valve 126. The video signals in the video blocks are sequentially loaded to the pixels of the light valve; and are used to reset the operational states (e.g. the ON and OFF state in a binary mode) of individual pixels in the light valve. The pixels of the light valve then modulate the incident illumination light based upon the loaded video signals so as to generate the sub-frames on screen 136 through optical element 128.

Reference signals in the reference blocks are also delivered and loaded to the light valve (126) for being displayed on the screen (136). However, the reference signals are delivered and/or loaded to the light valve (126) based upon the desired coding scheme for coding the video signals.

In one example for coding video signals in video blocks (e.g. $R_1$, $L_1$, $R_2$, and $L_2$) in video stream 120 as illustrated in FIG. 2a, video signals (e.g. in the form of bitplanes) in video block $R_1$ can be delivered and loaded to the light valve so as to generate an image for the right eye on the screen. After a time interval equal to B, reference signals of reference block 112 are delivered and/or loaded to the light valve so as to generate the predetermined reference image on the screen. After a time interval equal to (E−B−A), video signals in video block $L_1$ 104 are delivered and loaded to the light valve so as to generate an image for the left eye on the screen. After a time interval equal to C upon the completion of displaying video frame 104, reference signals in reference block 114 are delivered and/or loaded to the light valve so as to generate the predetermined reference image on the screen. The above processes continuous after all video signals in video blocks and reference signals in reference blocks are displayed by the light valve.

The displayed reference images can be captured by detector 194 as schematically illustrated in FIG. 3. Based on the detected reference images, the displayed video images/sub-frames can be identified and differentiated based upon the occurrence of the detected reference images. The detection information can then be forwarded to other components, such as the active shutter glasses for delivering the right and left images to the right and left eyes appropriately, which will be discussed afterwards with reference to FIG. 8 through FIG. 10c.

Figure 4:
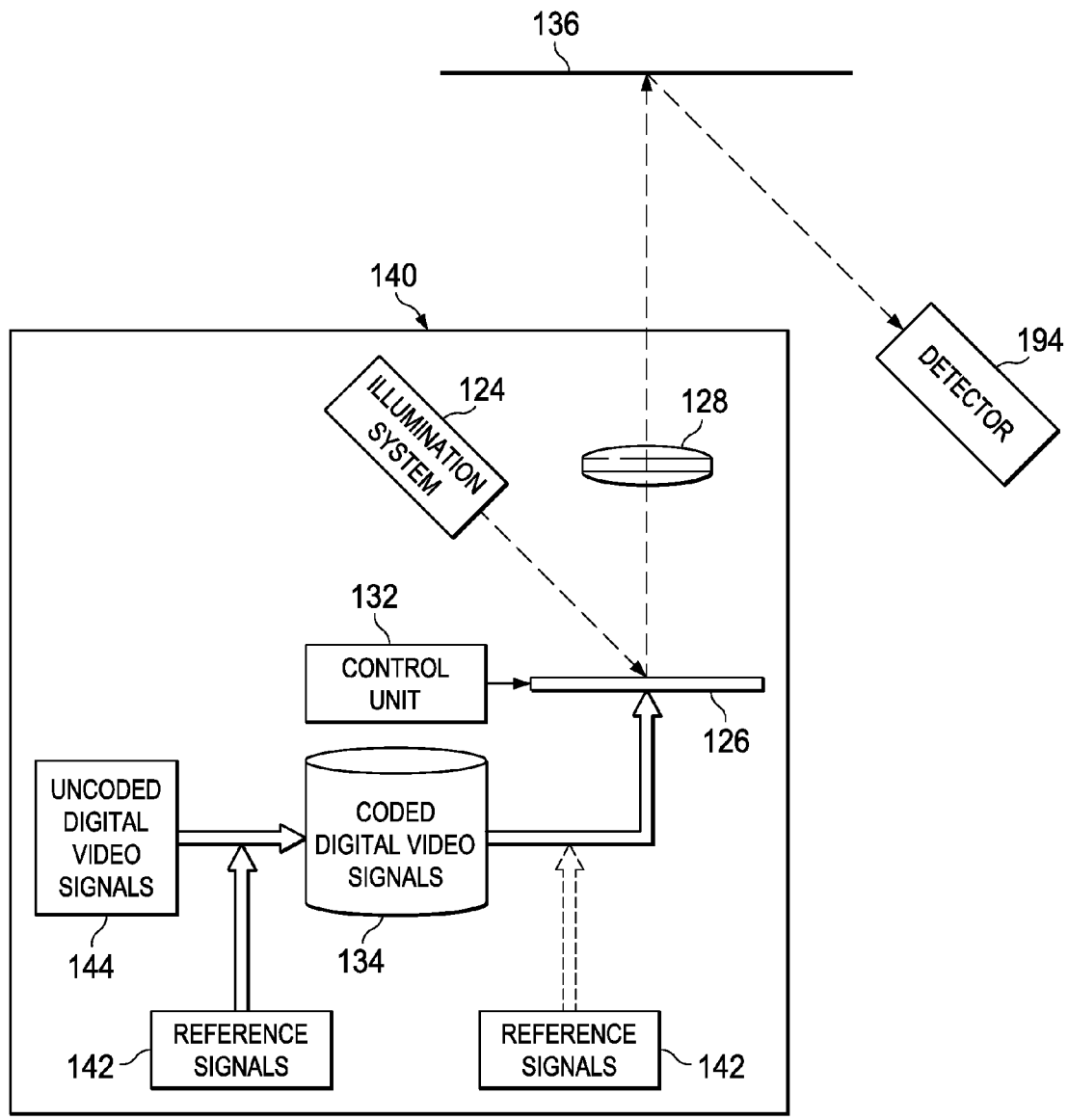
FIG. 4 schematically illustrates another exemplary method of coding digital video signals in an imaging system.

In an alternative example, the reference blocks can be inserted in the video stream prior to being loaded to the light valve, an example of which is schematically illustrated in FIG. 4. Referring to FIG. 4, coding system 140 of the display system comprises illumination light 124, light valve 126, control unit 132, storage 134, and optical element 128. The light valve 126 can be the same as that in the display system as discussed above with reference to FIG. 3. It is noted that when the light valve comprises self-light emitting pixels, such as plasma cells or LEDs or lasers, the illumination system may not be necessary.

The reference blocks (e.g. reference blocks 112, 114, 116, and 118 of video stream 120 in FIG. 2a) can be stored in storage 142. The reference blocks are inserted to the video stream before being displayed, such as before storing the video signals in the video blocks in storage 134. Alternatively, the reference blocks can be inserted to the video stream after storing the video signals in the video blocks in storage 134 but before being loaded to the light valve, as demonstrated by the dashed lines. As a consequence, the coded video stream, which carries both of the video blocks and reference blocks, is delivered and/or loaded to the light valve (126). The light valve sequentially displays the video signals in the video blocks and the reference signals in the reference blocks on screen 136. The control unit (132) in this example may or may not be aware of the presence of the reference signals in the video stream loaded to the light valve. The displayed images, which comprise the right eye images, left eye images, and the reference image, each create an average light pattern. These average light patterns can be detected by detector 194.

Depending upon the specific implementation of the coding scheme, decoding the reference signals (or reference images) and the video signals (or video images) can be implemented differently. In one example wherein the video signals and reference signals are displayed on a screen by an imaging system, the displayed video images/sub-frames can be decoded based on the detection of the reference images and the information of the detected reference images, which will be detailed in the following. This decoding scheme is especially useful in stereoscopic and multi-view imaging applications. It will be appreciated by those skilled in the art that the following discussion is for demonstration purposes, and should not be interpreted as a limitation.

When the video signals in the video blocks and the reference signals in the reference blocks are displayed an imaging system on a screen, video sub-frames and reference images can be sequentially presented on the screen. The displayed images are decoded so as to determine 1) if the displayed image at a particular time is a reference image or a video sub-frame; and 2) if the displayed video sub-frame at a particular time is for the right eye or for the left eye in a stereoscopic imaging application, or to determine if the displayed image at a particular time is for the first viewer or for the second viewer or any subsequent viewer in a multi-view imaging application. The detection is based upon the detection of the reference images; and the detection of the reference images is based upon the waveform information obtained by the detector in conjunction with predetermined criteria, wherein the waveform corresponds to the responses of the detector to the displayed images on the screen. For example when a reference block causes a full-white image on a screen for a time period of 25 micro-seconds, this full-white image may cause a voltage or current pulse in the output of the detector for a time period of substantially 25 microseconds.

Figure 5A:
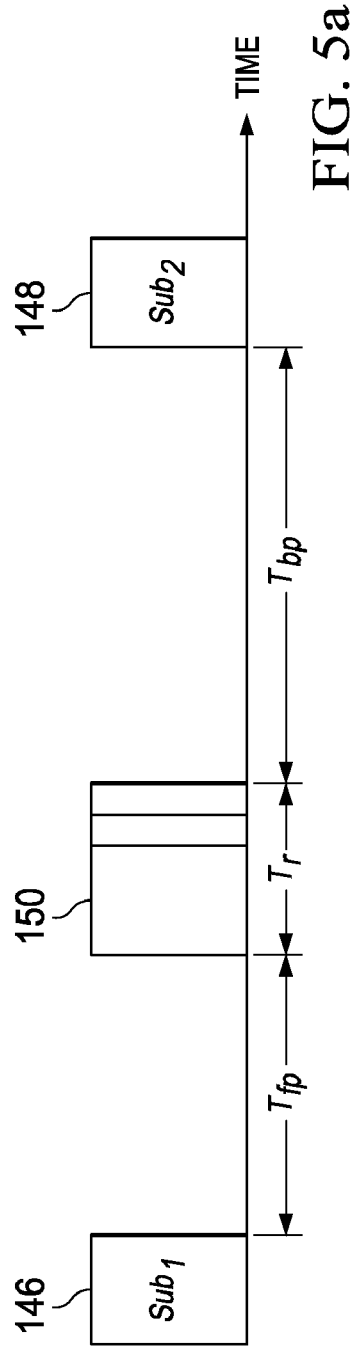

Referring to FIG. 5a, $Sub_1$ 146 and $Sub_2$ 148 are two consecutive sub-frames displayed on a screen. Reference image 150 is between the two sub-frames 146 and 148. The time interval between the front-edge of reference image 150 and the trailing edge of $Sub_1$ is the front-porch $T_{fp}$ of reference image 150. $T_r$ is the width or duration of reference image 150. In practice, a reference image may have a varying width due to pulse stretching in the receiver, as demonstrated by dashed-lines. The interval between the trailing edge of reference image 150 and the front edge of the next sub-frame $Sub_2$ 148 is the back-porch $T_{bp}$ of reference image 150. If it is determined that the edge-to-edge information of the detected image satisfies all of the following three groups of criteria, the detected image is referred to as a valid reference image.

A detected image is a valid reference image if it is determined that: 1) the width (duration) of the detected image is within a predetermined width range, such as within a range from 24 to 40 micro-seconds; 2) the front-porch $T_{fp}$ of the detected image is within a predetermined front porch range, such as around 104 micro-seconds; and 3) the back-porch $T_{bp}$ of the detected image is within a predetermined back-porch range, such as a range from 112 to 128 micro-seconds.

Figure 5B:
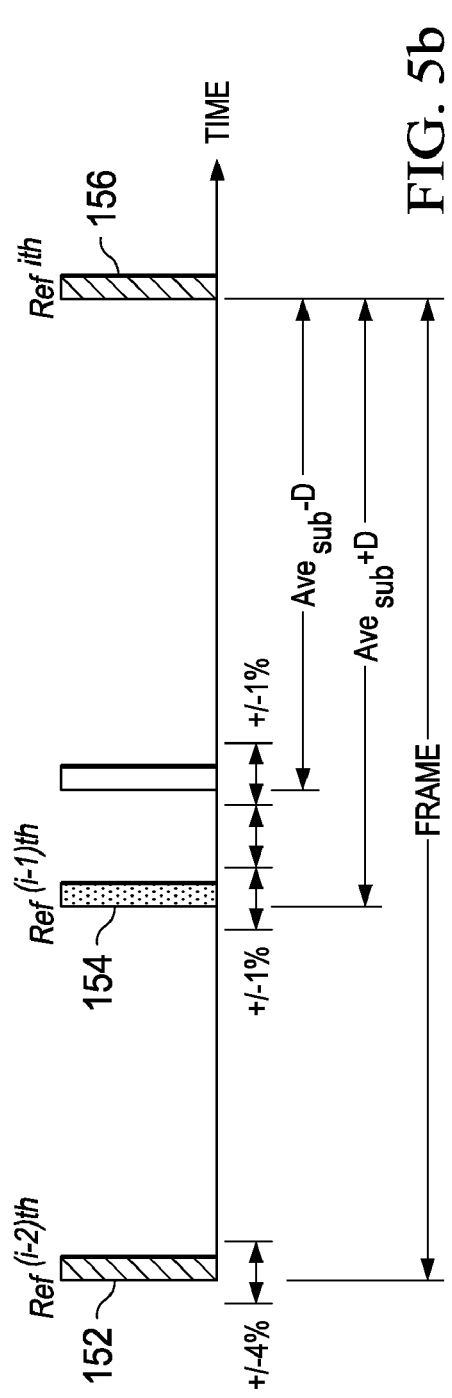

In order to guarantee that a detected signal is one of a sequence of valid reference images in an encoded video stream, a sequence of detected images is examined based upon another group of criteria, as illustrated in FIG. 5b.

Referring to FIG. 5b, $Ref^{(i-2)th}$ 152, $Ref^{(i-1)th}$ 154, and $Ref^{ith}$ 156 are detected sequence of reference images (e.g. each satisfying all criteria in group 1 as discussed above). The detected reference images are valid sequence of reference images if the following criteria are satisfied: 1) within a predetermined range, such as within the range of 26 to 40 micro-seconds for the width(s) of the detected reference images, the values of ($Ave_{sub}$–D) and ($Ave_{sub}$+D) between consecutive reference images (e.g. between reference images $Ref^{(i-1)th}$ 154, and $Ref^{ith}$ 156) are consistent throughout the detected sequence of reference images within a predetermined error (e.g. ±1%); and 2) the D values extracted from the edge-to-edge information of the detected sequence of reference images are within a predetermined error range, such as ±1%.

In order to guarantee that the at least one valid video sub-frames is present in the detected reference images, the detected signals between the detected reference images are examined in accordance with the following criteria, as demonstrated in FIG. 5b.

A valid video image exits in the detected sequence of reference images if: 1) the detected frame period between the odd or even pairs of reference images (e.g. between detected reference images $Ref^{(i-2)th}$ 152 and $Re^{ith}$ 156) is substantially equal to the expected frame period within a predetermined range, such as within ±4%; 2) the detected frame periods between the odd or even pairs of reference images are consistent within the error range throughout the detected sequence of video sub-frames; and 3) the average sub-frame period between two consecutive sub-frames is substantially the half of the averaged frame period.

Figure 6:
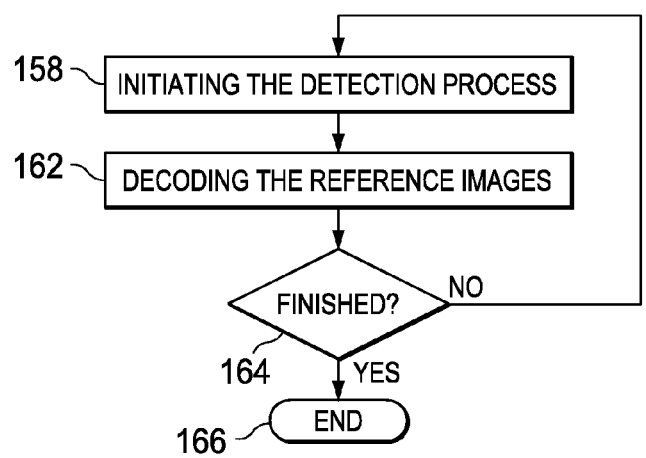
FIG. 6 is a flow chart showing the steps for detecting the coded video signals in FIG. 2a by using the criteria illustrated in FIG. 5a and FIG. 5b.

Based upon the waveform information of the detected images and the above discussed criteria, reference images and sub-frames can be decoded through a decoding process, and example of which is shown in the flow chart in FIG. 6. Referring to FIG. 6, the decoding process is initialized at step 158.

During the initialization, the decoding process utilizes a hardware comparator and a software timer to measure the amount of time between the detected waveform edge transitions. The timing information of the edge transitions detected by the comparator can be placed in memory storage. The amount of time between two adjacent transitions is compared to an initial variable for the amount of back-porch dark-time. If the timing satisfies the criterion for the correct back-porch, the previous timing in the memory storage can be compared to the next variable for the correct reference image pulse width (time duration). If the timing again satisfies the correct pulse width, the timing information in the memory storage previous to the pulse width timing can be compared to another variable for the front-porch timing. If all three criteria are satisfied, the decoding process proceeds to decoding the reference image, e.g. to determined if the reference image is for the right or the left eye image.

Because the placement of the reference blocks within the encoded video stream can be the same for every video block to be displayed on the screen, the decoding process can predict when the next set of reference images will be displayed on the screen through the use of a software Phase Lock Loop (PLL). Once the decoding process has found a match for all three of the above criteria and decoded the detected reference image, it initiates a software Phase-Lock-Loop with a second timer based on another variable for sub-frame refresh rate, such as 120 Hz. The decoding process may ignore the inputs from the hardware comparator until the Phase Lock Loop timer reaches the specified count for the sub-frame refresh rate (e.g. 120 Hz), and then proceeds to place timing information for input comparator in the memory storage and compares those inputs to the variables for back-porch, pulse width, and front-porch. Because data from the hardware comparator during the Phase Lock Loop timer count is ignored, the decoding process is able to filter out unwanted video signals from the light valve and noise from other light sources in the surrounding area.

If a new detected image signal does not match the variables for back-porch, pulse width, and front-porch when the Phase Lock Loop timer count ends, the decoding process may toggle the state of the output and tries again to find the reference images after the specified Phase Lock Loop timer count ends. It continues searching this way for a predetermined time, such as 10 seconds. If no valid reference images are found, the Phase Lock Loop timer variable is changed to the specified count for a new screen refresh rate, such as 50 Hz and loops back into the initialization to find the reference images and start the decoding process over for the new screen refresh rate, such as 50 Hz operation.

Because the output data from the decoding process is allowed to toggle at the correct time in the absence of correct images, the decoding system is capable of "free-wheeling" and operating uninterrupted in the presence of external interference without any input data for up to ten seconds while the system looks for the correct input variables.

Referring again to FIG. 6, after the initializing step (158) as discussed above, the valid reference images can be decoded at step 162. If it is determined that the reference images displayed on the screen have been decoded (step 164), the decoding process can be terminated at step 166. Otherwise, the decoding process returns back to the initializing step 158; and the decoding process repeats.

Figure 7A:
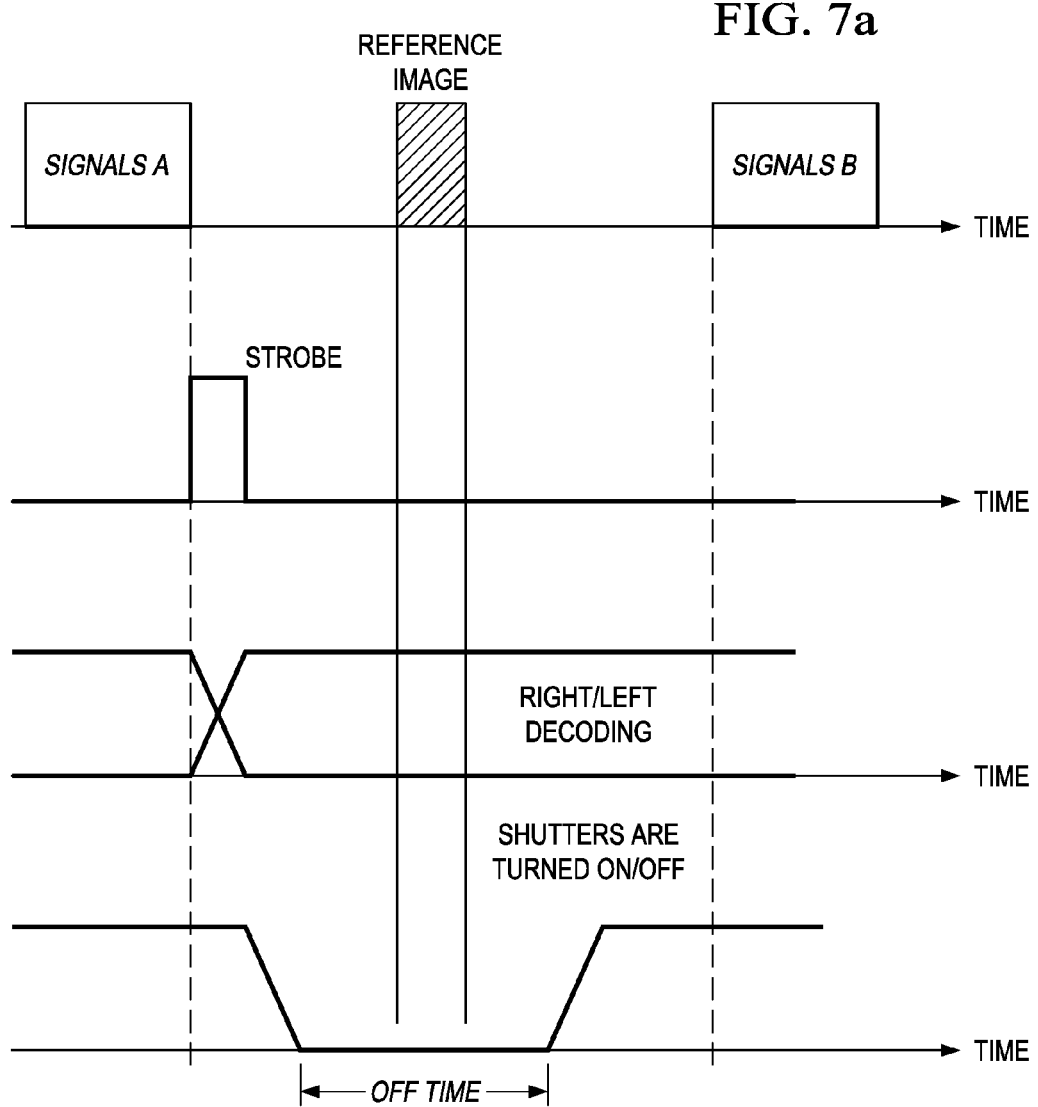
FIG. 7a through FIG. 7c demonstrate an exemplary decoding method.
Figure 7B:
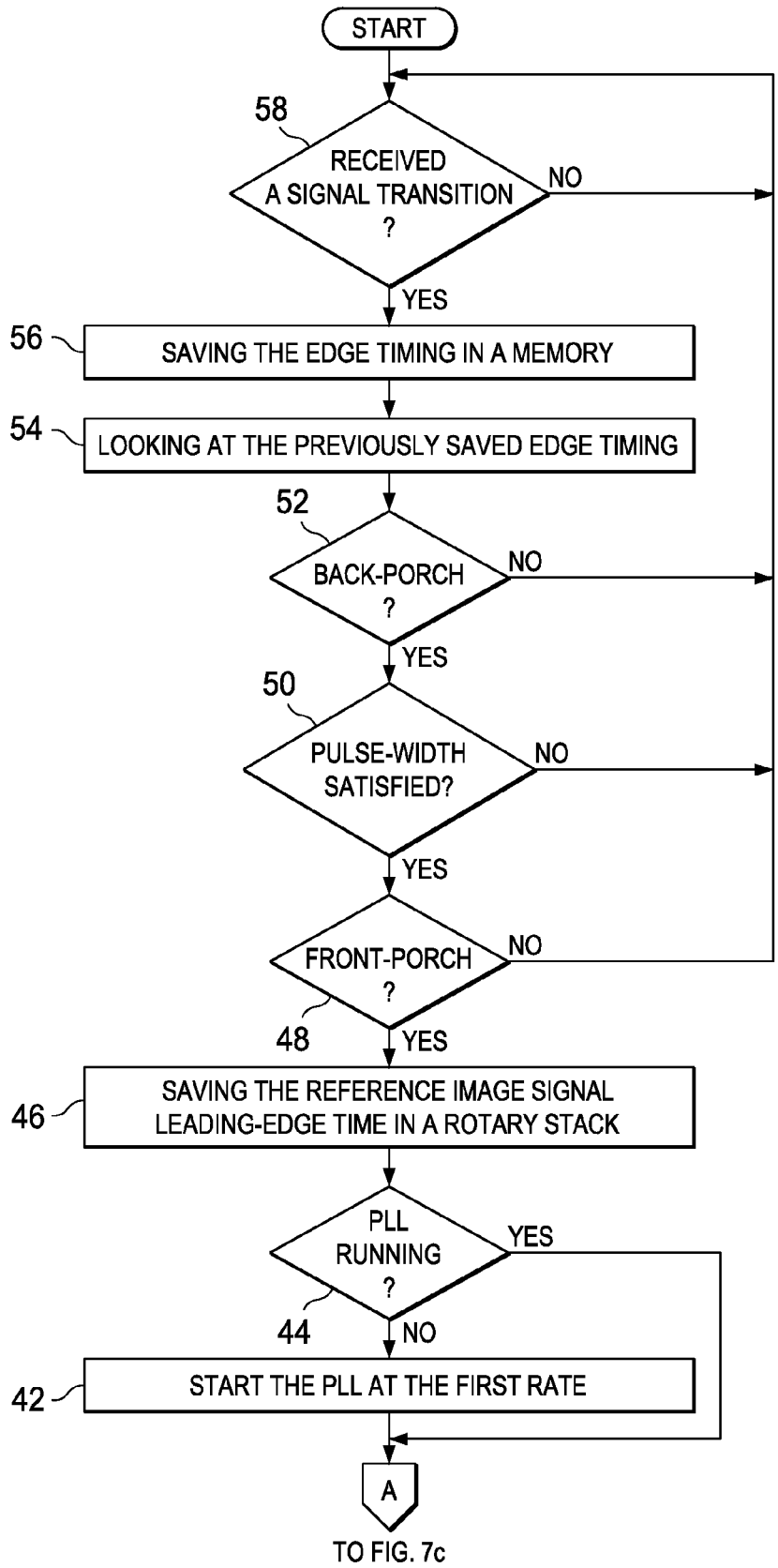
Figure 7C:
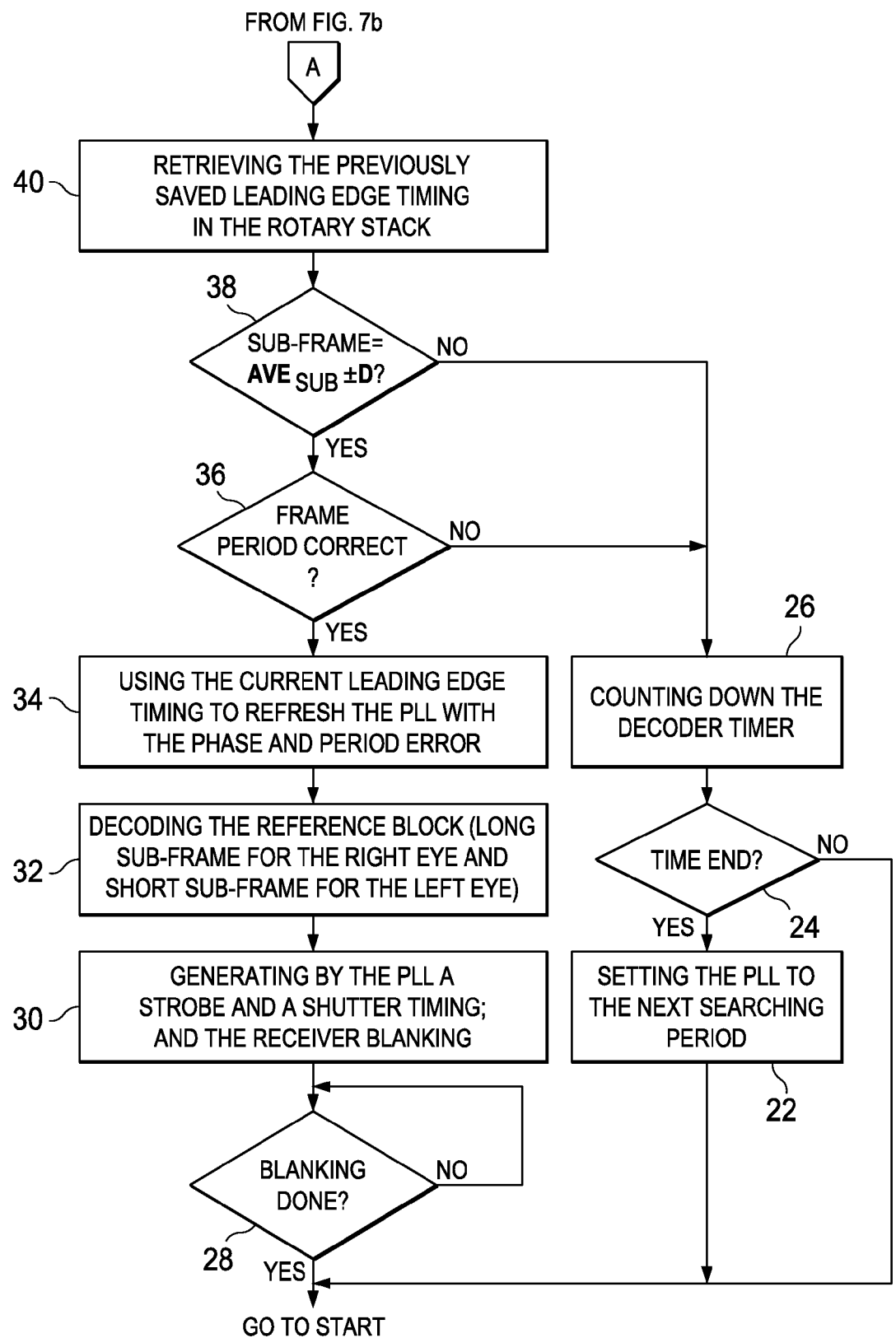

For demonstration purpose, an exemplary implementation of the decoding process as discussed above with reference to FIG. 6 is demonstrated in FIG. 7a through FIG. 7c. Referring to FIG. 7a, the exemplary coding process is diagrammatically summarized herein. A reference image signal is between signals A and B, each of which can be a video image signal or a noise signal or a combination thereof. After the successful detection of the reference image signal and video image signals A and B based upon the predetermined criteria as discussed above, a phase-lock-loop (PLL) is initiated; and the PLL generates a strobe signal. The strobe signal has a leading edge substantially aligned to the trailing edge of the signal A (the video image signal immediately prior to the reference image signal). The strobe may have a pulse width of any suitable values, such as few microseconds (e.g. 5 microseconds). The detected reference image signal is decoded (e.g. to extract the relative position of the reference image signal between video images) so as to determine if the video image signal (e.g. video image signal A or B) identified by the reference image signal is for the right or the left eye of the viewer. After the strobe both shutters for the right and left eyes can be turned off such that the reference image signal is substantially within the time period when both shutters are turned off. This can be useful especially in preventing light of the reference image from passing through the shutters and reducing the contrast ratio of the images perceived by the viewer. In one example, the shutters can be turned off for a time period of a few hundred microseconds. One of the shutters is turned on before the next video image signal (e.g. video image signal B) based upon the decoded reference image signal. For example, if the decoded reference image signal indicates that the next video image signal is for the left eye, then the shutter for the left eye is turned on before arrival of the next video image signal; while the shutter for the eight eye remains off.

The decoding process as demonstrated in FIG. 7a is detailed in a flow chart as shown in FIG. 7b and FIG. 7c. Referring to FIG. 7b, the decoding process determines if a signal transition (e.g. a leading edge or a trailing edge of a reference image signal or a video image signal) is received at step 58. If no signal transition is received, the decoding process loops back and keeps on detecting signal transitions.

If a signal transition is received after the determination at step 58, the edge timing (timing of the transition) can be saved in a memory, such as a temporary memory (step 56). The decoding process then looks at the previously saved edge timing (step 54), and compares the edge timing information with a set of predetermined values so as to determine a valid reference block according to a set of predetermined criteria, such as the criteria discussed above. Specifically, the amount of time between two consecutive transitions (e.g. between the current edge transition and the previous edge transition stored in the memory) is compared to an initial variable for the amount of back-porch dark-time (step 52). If the timing satisfies the criterion for the correct back-porch, the previous timing in the memory storage can be compared to the next variable for the correct reference image pulse width (time duration) (step 50). If the timing again satisfies the correct pulse width, the timing information in the memory storage previous to the pulse width timing can be compared to another variable for the front-porch timing (step 48). If all three criteria are satisfied, the decoding process pushes the leading-edge (LE) timing of the reference image signal into a memory, such as a rotary memory stack (step 46).

If anyone of the criteria in determination steps 52, 50, and 48 is not satisfied, the decoding process loops back to the beginning of step 58 to keep on detection of signal transitions.

After step 46 wherein the leading-edge timing of the reference image signal is saved in the memory (e.g. a rotary memory stack), it is determined if the phase-lock-loop (PLL) is running (step 44). If the PLL is not running, the decoding process starts the PLL with a first rate based on a variable for sub-frame refresh rate, such as 8.333 microseconds (step 42). Otherwise (i.e. the PLL is already running), the decoding process bypasses step 42 and proceeds to step 40 as illustrated in FIG. 7b.

Referring to FIG. 7b, the decoding process searches the memory (e.g. the rotary memory stack) for the leading-edge timings that satisfy the average sub-frame period and the frame period criteria as discussed above. This step can be important especially when there are other leading-edge timings in the memory (e.g. the rotary memory stack) which satisfy the criteria for the back-porch, pulse-width, and the front-porch. The above back-in-time search can be performed for a frame time period. Specifically, the decoding process retrieves the previously saved leading-edge timing from the memory (e.g. the rotary memory stack) at step 40, and determines if the amount of the time (between the current leading-edge timing and the retrieved timing of the previously saved leading edge) satisfies the criterion for the average sub-frame period $Ave_{sub} \pm D$ (step 38). If the average sub-frame period is satisfied, it is further determined if a second saved time satisfies the criterion for the frame period (step 36). If all the above two criteria are satisfied, the decoding process uses the current leading-edge timing to refresh the PLL with the predetermined phase and period error (such as the criteria discussed above) at step 34.

The decoding process proceeds to decode the reference image signal to determine if the video image signal identified by the reference image signal is for the right or the left eye (step 32). For example, the decoded reference image with a longer sub-frame period indicates a video image identified by such reference image for the right eye of the viewer; while the decoded reference image with a shorter sub-frame period indicates a video image identified by such reference image for the left eye of the viewer.

After decoding the reference image signal, the phase-lock-loop may generate a strobe signal and a shutter timing signal for the shutters; and setting the receiver to remain blanked (step 30). After setting the receiver to remain blanked for a predetermined time (step 28), such as a time period corresponding to the specified count for the sub-frame refresh rate (e.g. 120 Hz), the decoding process loops back to the start (in FIG. 7b), such as proceeding to place timing information for input comparator in the memory storage and compares those inputs to the variables for back-porch, pulse width, and front-porch. Otherwise, the decoding process remains the state wherein the receiver remains blanked. During the time when the receiver remains blanked, the decoding process may ignore the inputs from the hardware comparator. Because data from the hardware comparator during the Phase Lock Loop timer count is ignored, the decoding process is able to filter out unwanted video signals from the light valve and noise from other light sources in the surrounding area.

If anyone of the criterion in steps 38 and 36 is not satisfied, the decoding process counts down the decoder timer (step 26). The decoder timer can be initialized at the beginning of the decoding process with a predetermined initial value, such as 10 seconds. If the time of the decoder timer ends after the counting down (step 24), the decoding process sets the PLL to the next searching period corresponding to a new screen refresh rate, such as 50 Hz. If the decoder time does not end, the decoding process loops back to the start step in FIG. 7b and tries to find new reference image signals.

After decoding a valid reference image, the video sub-frame referenced by the decoded reference image can be identified. For demonstration purpose, FIG. 8 schematically illustrates an exemplary method of identifying video images based upon the decoded reference image.

Figure 8:
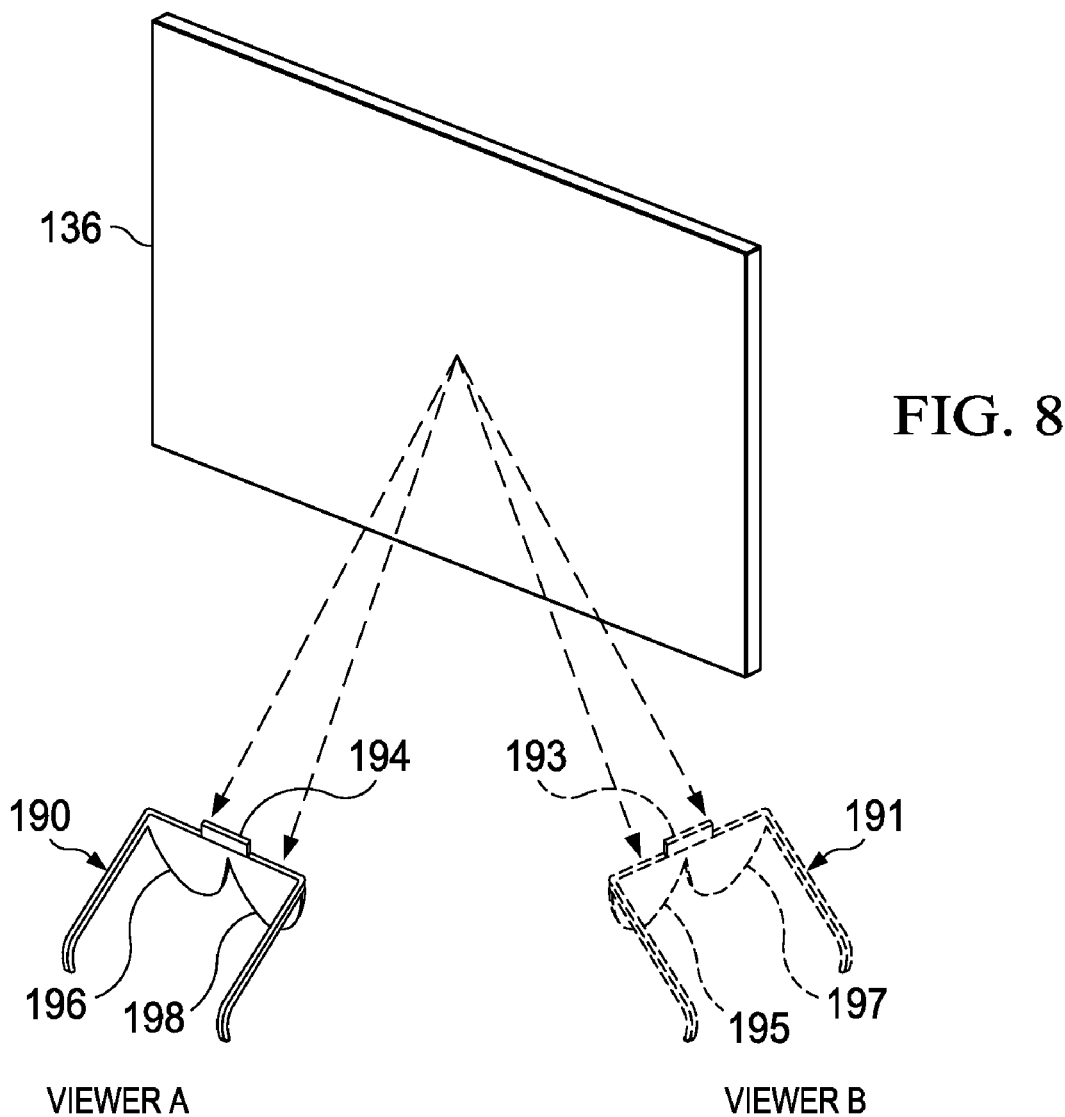
FIG. 8 is a diagram schematically illustrating an exemplary imaging system capable of presenting stereoscopic video signals using active shutter glasses.

Referring to FIG. 8, video and reference images as discussed above are displayed on screen 136 (as illustrated in FIG. 3 and FIG. 4). The displayed reference and video images are detected by detector 194 associated with eyewear 190 that further comprises shutters 196 and 198 for the right and left eye.

In a stereoscopic imaging application, the sub-frames for the right and left eye, as well as the reference signals, are sequentially displayed on the screen (136). The shutters 196 and 198 are turned off at the beginning of each dark-time (e.g. after the trailing edge of the strobe). This can be useful especially in preventing light from reference images from passing through the shutters and reducing the contrast ratio of the images perceived by the viewer. After a successful decoding of a reference image and before the arrival of the next video sub-frame, the shutter in front of the eye (e.g. the right or the left eye) for viewing the video image that is referenced by the decoded reference image is turned on; while the shutter for the other eye is turned off.

In one example with reference to FIG. 2a, both shutters (196 and 198 in FIG. 8) for the right and left eye are turned off after the trailing edge of the strobe following the sub-frame $R_1$. After reference image 112 is identified for sub-frame $L_1$ for example, the shutter for the left eye is turned on for capturing sub-frame $L_1$ and delivering sub-frame $L_1$ to the left eye of the viewer. During this time period, the shutter for the right eye is turned off so as to occlude $L_1$ to be delivered to the right eye of the viewer.

Referring again to FIG. 8, in another example of a dual-view imaging application, video frames or sub-frames for different viewers (e.g. viewer A and viewer B), as well as the reference images, can be displayed on the screen 136 sequentially. Detectors 194 and 191 of eyewear 190 and 191 for viewers A and B capture the displayed images on screen 136. All of the shutters can be turned off at the beginning of a dark-time. When the detectors detect a reference image indicating a coming sub-frame (or a video frame) for a particular viewer, such as viewer A (or View B), the shutters of the eyewear for the particular viewer, such as viewer A (or viewer B) are turned on to receive the coming sub-frame (or video frame); while the shutters for the other viewer (e.g. viewer B) are turned off. The sub-frames (or video frames) can thus be delivered to the respective viewers; and the different viewers can experience the viewing at the same time. It is noted that more than two viewers can be present at the same time. Reference images with different profiles may be necessary to identify the video signals for different viewers.

The capturing and decoding of the video images and the reference images are accomplished by using a detector, such as detector 194 or 191 in FIG. 8, in accordance with the decoding scheme as discussed above. In either one or both of stereoscopic and multi-view imaging applications, the decoder (e.g. the eyewear) can be wirelessly synchronized to the displayed images using the same light (e.g. the same visible light) as the video images (and the reference images).

The detector can be implemented in many ways. In one example, the decoder is configured such that different functionalities are separated in to different groups. The functionalities in the same group are performed by one digital processor; while functionalities in different groups are performed by separate digital processors. The processors can be disposed serially, in parallel, or in any suitable combinations thereof, along the flow of the signals to be processed. For demonstration purpose, FIG. 9a and FIG. 9b diagrammatically illustrate an exemplary decoder.

Figure 9A:
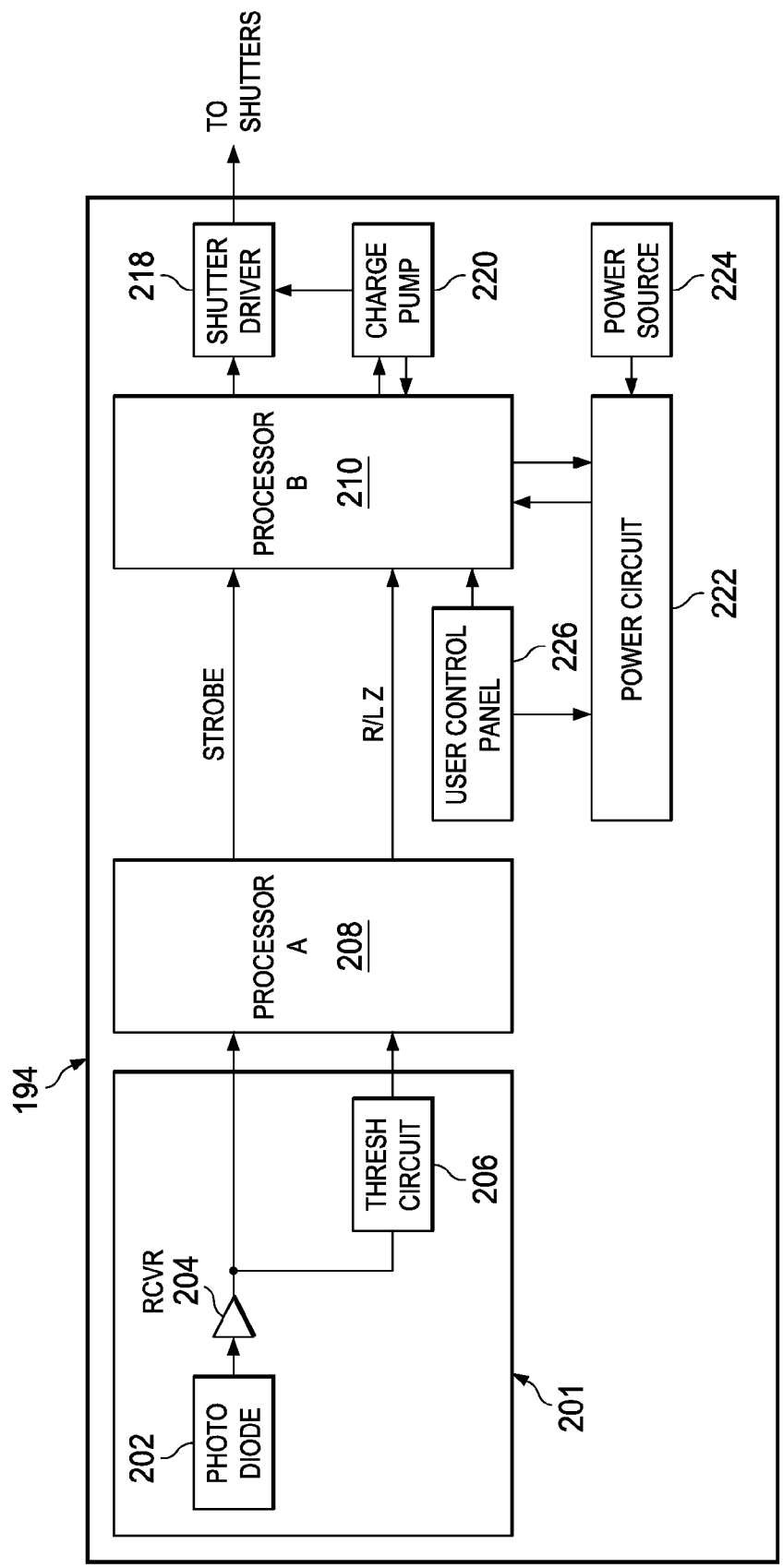
FIG. 9a is a block diagram showing the functional modules and operation of the synchronization unit that can be used in the shutter glasses in FIG. 8.
Figure 9B:
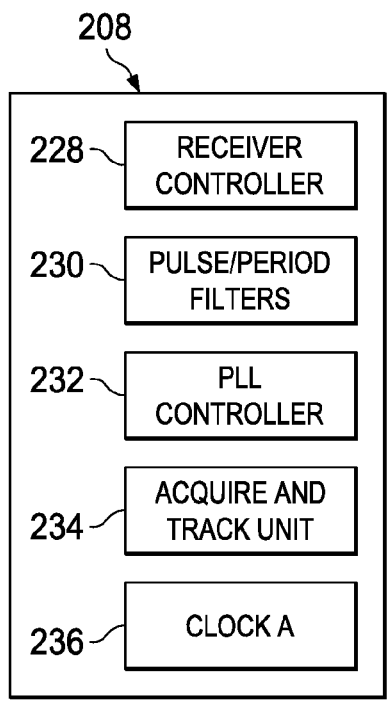

Referring to FIG. 9a, detector 194 in this example comprises signal receiver 201, dual-processors 208 and 210, power circuit 222, power source 224, user control panel 226, and shutter driver 218.

The receiver (201) is provided for detecting light signals of images that are displayed on a screen, such as screen 136 in FIG. 8. For this purpose, the receiver (201) further comprises photo-diode 202, which can be a standard silicon diode sensor with optical signal to noise improvement for detecting visible light signals. Signal amplifier 204 is provided for the receiver (201) for amplifying the output electronic signals from photo-diode 202. The output of the amplifier (204) is connected to one of the dual-processors processor A 208. Adaptive threshold circuit 206 as an alternative feature can be connected to the output of amplifier 204 at an input and processor 208 at an output for performing noise filtering.

The diode sensor (202) can be selected so as to be capable of detecting substantially all light in the visible range, as well as other light ranges, such as infrared light. Accordingly, an optical filter may be associated with the diode sensor and used to eliminate any unwanted light, such as IR energy that might be received by the diode sensor. In addition, a low cost optical lens (diffractive or refractive lenses) may be associated with the diode sensor and used to gather and focus the desired visible light within the optimal detection light range of the diode sensor.

The optical lens can further serve to help isolate the diode sensor from straying ambient light conditions that may falsely trigger the detector. The combination of both of these optical techniques can improve the overall signal to noise ratio of the receiver. Further improvements can be achieved electrically with AC coupling, high signal gain, and/or intelligent filtering to eliminate signals that are not consistent with the expected synchronization signals (e.g. the reference signals) from the light valve. The resulting waveform is passed to processor A for detection.

The detection process in this example is implemented in a dual-processor configuration. Specifically, the desired functionalities related to the signal processing for the detected signals are divided into groups. The functionalities in the same group are performed by one digital processor; while functionalities in different groups are performed by separate digital processors. The processors (208 and 210) in this example are disposed serially along the flow of the signals to be processed.

In this implementation as illustrated in FIG. 9a, the first processor (e.g. processor A 208) is responsible for capturing video image signals, such as the image signals from the screen; and decoding the captured video signals according a coding scheme as discussed above using a phase-lock-loop. Specifically, the first processor (208) is designated for capturing and tracking the synchronization signal from the receiver (201), determining the period and pulse width using various filters in accordance with the criteria as discussed above with reference to FIG. 5a and FIG. 5b, and operating a phase-locked-loop that will be used to maintain the synchronization lock with the display. This processor can run at any suitable frequencies, such as 16 MHz. Accordingly, processor A 208 comprises multiple functional modules, as schematically illustrated in FIG. 9b.

Referring to FIG. 9b, processor 208 comprises receiver controller module 228, pulse/period filter module 230, PLL controller module 232, acquire and track module 234, and clock 236. The receiver controller (228) and the acquire-and-track module (234) are provided for capturing and tracking the synchronization signal from the receiver (201). The pulse/period filter module (230) is provided for determining the period and pulse width using various filters. The PLL controller module (232) is provided for operating a phase-locked-loop that will be used to maintain the synchronization lock with the display. Clock 236 is designated for providing independent clock signals for processor A (208) such that processor A 208 can be operated at any suitable clock independently from other components, such as from processor B 210.

Referring back to FIG. 9a, the output signals, such as synchronization signals R/L Z and strobe signals for the right and left eye are delivered to processor B 210. The second processor, processor B 210, is provided for power management for other components. For example, processor B 210 provides power management for charge pump unit 220, user control panel 226, and shutter driver 218 of detector 194.

The shutter driver (218) provides driving signals for the shutters. Depending upon the specific shutters used, the shutter can be configured in many different ways, which will be discussed afterwards. The charge pump unit (220) is provided as an alternative feature for generating desired driving waveforms for the shutters, which will be discussed afterwards with the shutter driver.

User control panel 226 is provided as an interface for allowing the viewer to control the detector. In particular, the user control panel comprises a mode-switching function that enables the viewer to switch the detector from one operational mode to another, such as from the stereoscopic viewing mode to multi-view mode.

Power source 224, such as a button battery or any other suitable power sources, are connected to processor B 210 through power circuit 222, wherein the power circuit is provided for controlling the voltage and/or current applied to the components of detector 194.

Figure 9C:
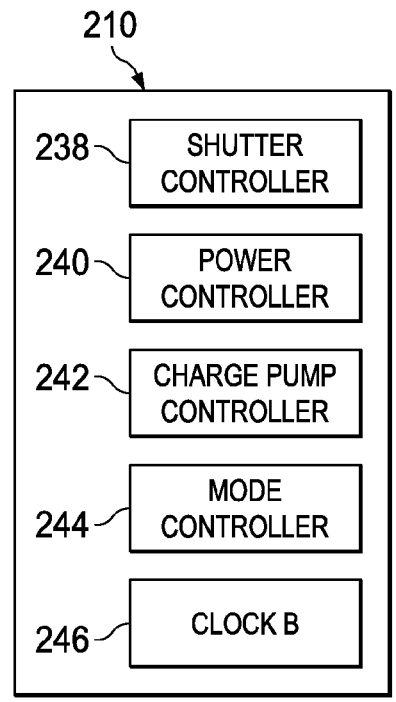

For demonstration purposes, FIG. 9c diagrammatically illustrates an exemplary configuration of processor B 210. Referring to FIG. 9b, processor B 210 in this example comprises shutter control unit 238 for providing control signals for the shutter driver (218 in FIG. 9a), power control unit 240 for managing power for other components in the decoder, charge pump control unit 242 for managing the operation of the charge pump unit (220 in FIG. 9a), mode control unit 244 for managing the operation mode of the detector (e.g. switching between the stereoscopic imaging mode and the multi-view mode). Clock B 246 is provided in processor B 210 for providing independent clock signals for processor B 210 such that processor B can be operated at an independent frequency. In one example, processor B 210 can be operated at 1 MHz.

Either one or both of the processors A (208) and B (210) can be implemented as many different electronic circuits. For example, the processors can be implemented as a field-programmable-gate array (FPGA) chip, an application-specific-integrated-circuit (ASIC) chip, or other types of electronic circuits, such as a digital signal processor (DSP).

This solution with dual-processors has advantages over a single processor implementation. For example, it allows the easy separation of independent functionality that requires different clock rates and on times, which makes the design much more efficient on battery power, because the duty-cycle of each processor and the clock speed can be optimized for only the functions it performs. The processors can each be put in stand-by mode when they are not needed. This solution allows for some of the implementation to be a closed architecture to protect intellectual-property and insure consistent operation with the TVs among various shutter glasses suppliers. Other parts of the design can be an open architecture where it is necessary to provide design flexibility to different suppliers.

In other examples, the two processors can be integrated into a single processor that comprises first and second functional groups. The first functional group comprises functional modules that are capable of performing the desired functions of the first processor; and the second functional group comprises functional modules that are capable of performing the desired functions of the second processor. The two functional groups may share a common clock in the single process but are capable of being operated at different speeds through, for example, a speed accelerator. Alternatively, the single process may have different clocks for providing different clock signals for the first and second functional groups.

Referring again to FIG. 9a, the shutter driver (218) is provided for controlling the operation of the shutters. Depending upon different configurations of shutters, the shutter controller can be different.

Shutters are generally referred to as any suitable device capable of temporarily shuttering or substantially blocking out light provided to the wearer's eyes from the screen. Specifically, the shutter glass may block the view of the left eye while shuttering allows the right eye to see the displayed right image on the screen.

Figure 10A:
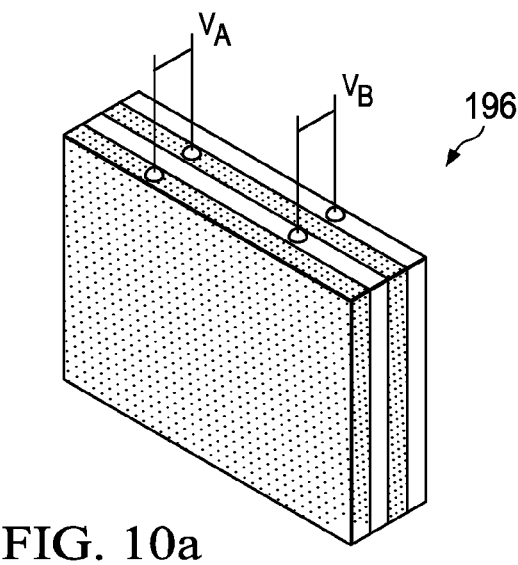
FIG. 10a schematically illustrates an exemplary shutter that can be used in the shutter glasses in FIG. 8.

Shutters may shutter light received from the display screen by any of a variety of methods. For example, each shutter may comprise mechanical, electromechanical, or electro-optical shutters, such as liquid crystal panels. In one example, each shutter of the shutter glasses comprises dual LCD panels that are arranged in a PI configuration, as schematically illustrated in FIG. 10a. It is noted that the LCD panels can be arranged in many other possible ways.

Referring to FIG. 10a, shutter 196 in this example comprises a front standard pair of LCD panels and back standard pair of LCD panels. The two LCD panels are arranged in a PI configuration so as to achieve a high contrast ratio, such as a contrast ratio of 15000:1 or higher, especially in the multi-view mode.

Operations of the LCD panels are controlled by control signals, such as $V_a$ and $V_b$, applied to the front and back of each LCD panel. The necessary driving waveforms are provided by the shutter driver (218 in FIG. 9). For driving the dual LCD panels in each shutter, three different voltages can be applied to each of the panels at the right time to cause the desired result. The driving voltages can be 18V, 2.8V, and 0V, or other suitable voltage combinations. By applying these driving voltages to each panel, the panels can also be biased with overall waveforms that have values of +18V, +2.8V, 0V, −2.8V, and −18V (or other voltage combinations). For demonstration purpose, FIG. 10b diagrammatically illustrates waveforms applied to the shutter for the right eye; and FIG. 10c diagrammatically illustrates waveforms applied to the shutter for the left eye.

The three voltage control signals applied to the dual-LCD panels in each shutter are provided by the shutter driver (218 in FIG. 9a). The shutter driver is controlled by the shutter control unit 238 of the second processor—processor B 210 as illustrated in FIG. 9c. In one example, the shutter controller (238 in FIG. 9c) can be configured to be capable of providing 4 or more independent outputs for the shutter driver (in a stereoscopic imaging mode) or for each one of the shutter drivers (in a multi-view imaging mode). In addition to the 3 voltage signals, the independent outputs can also comprise a switching signal for instructing the LCD panels to switch between a stereoscopic imaging mode and a multi-view imaging mode.

In order to obtain driving signals with proper waveforms for the LCD panels, especially when the power source is not capable of providing voltage signals with desired amplitudes, the charge pump unit (220 in FIG. 9a) is provided to adjust the voltage driving signals with desired amplitudes.

In addition to the features as discussed above for the detector and the shutters, other features can be provided. For example, glasses can be made with a variety of shutter types, each with varying performance. If brightness is compromised because of transmission loss and polarization effects in LCD panels, some type of brightness compensation effect can be employed. A reduction in brightness can be caused by the shutter mechanism of the shutters. The transition time used by the shutters may be a significant amount of time out of the total available time. If shutters with a faster transition time are used, the blank-time (or dark time) can be reduced and the image may be brighter. In addition, the material properties of glasses may have polarization properties in addition to simple transmission losses. Therefore, brightness can be enhanced by using shutter mechanisms with better material properties.

It will be appreciated by those of skill in the art that a new and useful coding scheme capable of coding video signals is provided. An imaging architecture with both stereoscopic and multi-view capabilities of using the coding scheme is also provided. As discussed above, many portions or of the coding scheme are independent, and can thus be used independently from portions or all of the imaging architecture of this disclosure. For example, the coding scheme and the multi-processors configuration in a detector of an eyewear are independent; and can thus be used independently. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

The invention claimed is:

1. A method, comprising:
    displaying a stream of images on a screen, wherein the stream of images comprises a stream of video images and a stream of reference images for identifying the video images, comprising:
        providing a stream of video frames each comprising a set of video signals;
        providing a set of reference blocks each comprising a set of reference video signals corresponding to a predetermined reference image; and
        delivering the stream of video frames in the absence of reference blocks to a light valve that comprises an array of individually addressable pixels; and
        during displaying the video signals of the video frames, delivering the reference blocks to the light valve according to a predetermined coding scheme such that the light valve displays the video frames and reference blocks according to the predetermined coding scheme; and
    detecting the displayed stream of images using a detection unit, comprising:
        synchronizing the detection unit to the images being displayed on the screen using light from the images being displayed on the screen.

2. The method of claim 1, wherein the step of detecting the displayed stream of images further comprises:
    detecting the displayed reference images; and
    identifying the displayed video images based upon timing of the detected reference images.

3. The method of claim 1, wherein the displayed video images comprise first and second groups of video images for the right and left eyes of a first viewer in a stereoscopic imaging.

4. The method of claim 3, wherein the displayed video images further comprise a third group of video images for both of the right and left eyes of a second viewer.

5. The method of claim 1, wherein the step of synchronizing the detection unit to the images being displayed on the screen further comprises:
    turning on a shutter for the right eye of a viewer when the image displayed on the screen is for the right eye of a viewer; and
    turning off the shutter for the right eye and turning on a shutter for left eye of the viewer when the image displayed on the screen is for the left eye of the viewer.

6. The method of claim 1, wherein the step of synchronizing the detection unit to the images being displayed on the screen further comprises:
    turning on a pair of shutters for the right and left eyes of a first viewer when the image displayed on the screen is for the first viewer; and
    turning off the shutters for the first viewer and turning on a pair of shutters for right and left eyes of a second viewer when the image displayed on the screen is for the second viewer.

7. The method of claim 1, wherein the step of synchronizing the detection unit to the images being displayed on the screen further comprises:
  turning off a pair of shutters for the right and left eye of a viewer during a time period when a reference image is being displayed on the screen.

8. The method of claim 1, wherein the step of synchronizing the detection unit to the images being displayed on the screen further comprises:
  turning on a shutter for the right eye of a first viewer when the image displayed on the screen is for the right eye of the first viewer;
  turning off the shutter for the right eye and turning on a shutter for left eye of the first viewer when the image displayed on the screen is for the left eye of the first viewer; and
  turning off the shutters for the first viewer and turning on a pair of shutters for the right and left eyes of a second viewer when the image displayed on the screen is for the second viewer.

9. The method of claim 1, further comprising:
  providing a stream of video frames with each video frame comprising a sequence of video signals defining the stream of images; and
  coding the video frames using a set of reference blocks each comprising a set of image signals associated with a predetermined reference image of the stream of reference images, comprising inserting the reference blocks in the stream of video frames such that each video frame is identified by a profile of a reference block.

10. The method of claim 9, wherein the video stream comprises first and second groups of video frames that are periodically disposed in the stream such that video frames in different groups alternates in the video stream;
  wherein the set of reference blocks comprises a first sub-set of reference blocks for identifying the video frames in the first group and a second sub-set of reference blocks for identifying the video frames in the second group; and wherein the reference blocks of the first and second sub-sets alternate in the stream; and
  wherein a time interval between two adjacent reference blocks alternates between a first and second values.

11. The method of claim 9, wherein the reference blocks are disposed within every other time interval between two consecutive video frames in the stream.

12. The method of 9, wherein the video frames comprises first and second groups of video sub-frames for the right and left eyes of a first viewer in a stereoscopic imaging and a third group of video frames for both of the right and left eyes of a second viewer.

13. The method of claim 9, wherein the step of inserting the reference blocks in the stream comprises:
  delivering the video frames and the reference blocks to a light valve that generates a stream of video images based upon the video signals in the video frames and a sequence of reference images based upon the image signals in the reference blocks; and wherein the light valve comprises an array of individually addressable pixels.

14. The method of claim 9, wherein the step of inserting the reference blocks in the stream comprises:
  delivering the stream of video frames in the absence of reference blocks to a light valve that comprises an array of individually addressable pixels; and
  during displaying the video signals of the video frames, delivering the reference blocks to the light valve according to a predetermined coding scheme such that the light valve displays the video frames and reference blocks according to the predetermined coding scheme.

15. The method of claim 1, further comprising:
  receiving a stream of encoded video signals comprising a sequence of reference image signals and embedded video signals, the reference image signals defining the reference images and the video signals defining the video images;
  searching for a reference image, comprising:
    extracting a profile of each signal in the stream;
    determining a reference image based upon an extracted profile of a signal and a predetermined criterion; and
    decoding the found reference image.

16. The method of claim 15, wherein the step of searching for the reference signal comprises:
  extracting a timing information that comprises a front-porch, a pulse width, and a back porch timing of each detected signal; and
  comparing the extracted timing information with the set of predetermined criteria.

17. The method of claim 16, further comprising:
  searching for the embedded video signals comprising:
    upon detection of a reference signal, setting a phase-lock-loop timer to a first initial value; and
  capturing a valid video signal using the phase-lock-loop with the predetermined phase-lock-loop timer.

18. An imaging system of both stereoscopic and multi-view capabilities, comprising:
  an image display unit for displaying a stream of images on a screen, wherein the stream of images comprises a stream of video images and a stream of reference images for identifying the video images, comprising means for:
    providing a stream of video frames each comprising a set of video signals;
    providing a set of reference blocks each comprising a set of reference video signals corresponding to a predetermined reference image; and
    delivering the stream of video frames in the absence of reference blocks to a light valve that comprises an array of individually addressable pixels; and
    during displaying the video signals of the video frames, delivering the reference blocks to the light valve according to a predetermined coding scheme such that the light valve displays the video frames and reference blocks according to the predetermined coding scheme; and
  an image detection unit for detecting the displayed stream of images, comprising:
    synchronization means for synchronizing the detection unit to the images being displayed on the screen using light from the images being displayed on the screen.

19. The system of claim 18, wherein the image display unit comprises:
  a light valve comprising an array of individually addressable pixels; wherein the light valve comprises an array of micromirrors, liquid-crystal-display devices, liquid-crystal-on-silicon devices, plasma cells, or organic-light-emission-diodes.

20. The system of claim 18, wherein the synchronization means comprises:
  an eyewear comprising a pair of shutters;
  a detector for detecting light from the displayed images on the screen; and
  a shutter control unit for controlling operation of the shutters.

21. The system of claim 18, further including a decoding device, comprising:
- a receiver for detecting a stream of video signals comprising a reference image signal and a video image signal;
- a first processor for decoding the video image signal based upon a detection of the reference image signal and predetermined criterion; and
- a second processor for managing power for the components in the device, comprising:
  - a shutter control unit for providing control signals for a shutter that is connected to the second processor.

22. The device of claim 21, wherein the first and second processors comprise separate clocks.

23. The device of claim 21, wherein the second processor further comprises a mode controller for switching the detector and the shutter to switch between a stereoscopic mode to a multi-view mode.

24. The device of claim 21, further comprising:
- a receiver for receiving visible light, comprising;
  - a photo-diode;
  - an amplifier; and
  - a threshold circuit;
- a power source;
- a user control panel;
- a charge pump unit; and
- a power circuit.

* * * * *